United States Patent
Zhou et al.

(10) Patent No.: US 12,516,780 B2
(45) Date of Patent: Jan. 6, 2026

(54) VEHICLE-MOUNTED HYDROGEN SUPPLY METHOD AND DEVICE FOR HYDROGEN-RICH SMELTING IN BLAST FURNACE OR SHAFT FURNACE

(71) Applicants: Changli Xingguo Precision Parts Co., LTD, Qinhuangdao Heibei (CN); Shanghai University, Shanghai (CN)

(72) Inventors: Guocheng Zhou, Qinhuangdao Heibei (CN); Kai Zhu, Shanghai (CN); Quanli Liu, Qinhuangdao Heibei (CN); Yuwen Zhang, Shanghai (CN); Xionggang Lu, Shanghai (CN); Yuwen Yang, Qinhuangdao Heibei (CN)

(73) Assignees: Changli Xingguo Precision Parts Co., LTD, Qinhuangdao Heibei (CN); Shanghai Unviersity, Shanghai (CN)

( * ) Notice: Subject to any disclaimer, the term of this patent is extended or adjusted under 35 U.S.C. 154(b) by 52 days.

(21) Appl. No.: 18/681,984

(22) PCT Filed: Apr. 12, 2022

(86) PCT No.: PCT/CN2022/086287
§ 371 (c)(1),
(2) Date: Feb. 7, 2024

(87) PCT Pub. No.: WO2023/015924
PCT Pub. Date: Feb. 16, 2023

(65) Prior Publication Data
US 2024/0328582 A1 Oct. 3, 2024

(30) Foreign Application Priority Data
Aug. 12, 2021 (CN) .......................... 202110926501.2

(51) Int. Cl.
*F17D 1/04* (2006.01)
*F17D 1/075* (2006.01)
*F17D 5/00* (2006.01)

(52) U.S. Cl.
CPC ............... *F17D 1/04* (2013.01); *F17D 1/075* (2013.01); *F17D 5/005* (2013.01); *Y10T 137/877* (2015.04)

(58) Field of Classification Search
CPC . F17D 1/04; F17D 1/075; F17D 5/005; B67D 7/00; Y10T 137/2567;
(Continued)

(56) References Cited

FOREIGN PATENT DOCUMENTS

| CN | 207690924 U | 8/2018 |
|---|---|---|
| CN | 209294791 U | 8/2019 |

(Continued)

OTHER PUBLICATIONS

PCT International Search Report (and its English Translation) for PCTCN2022/086287 that is the parent application to the instant application; dated Jun. 30, 2022, 8 pages.

(Continued)

*Primary Examiner* — Kenneth Rinehart
*Assistant Examiner* — Jonathan J Waddy
(74) *Attorney, Agent, or Firm* — Harness, Dickey & Pierce, P.L.C.; Anthony G. Fussner

(57) ABSTRACT

A vehicle-mounted hydrogen supply method and device for hydrogen-rich smelting in a blast furnace or shaft furnace, combining steel plant hydrogen supply requirements with vehicle-mounted hydrogen supply technologies to construct a vehicle-mounted hydrogen supply system applied to hydrogen-rich smelting in a blast furnace or shaft furnace, thus providing an effective and reliable pathway for safe and stable hydrogen supply in a blast furnace or shaft furnace smelting process to perform hydrogen-rich smelting testing (Continued)

and production. Compared with a newly-built hydrogen plant, the invested construction cost is low, the operation flow is simple, the method and device are not limited by technical upgrading and transformation, and the flexibility is high. At the same time, two working long pipe vehicles and two pressure reducing system intake pipelines are used for solving the problem of continuous hydrogen supply required for hydrogen-rich smelting in a blast furnace.

10 Claims, 2 Drawing Sheets

(58) Field of Classification Search
CPC ..... Y10T 137/87684; Y10T 137/87692; Y10T 137/877
USPC ................................ 137/861, 112, 606, 607
See application file for complete search history.

(56) References Cited

FOREIGN PATENT DOCUMENTS

| CN | 209415038 U | 9/2019 |
|----|-------------|--------|
| CN | 110939862 A | 3/2020 |
| CN | 111207293 A | 5/2020 |
| CN | 113739581 A | 12/2021 |

OTHER PUBLICATIONS

PCT Written Opinion for PCTCN2022/086287 that is the parent application to the instant application; dated Jun. 30, 2022, 5 pages.

VEHICLE-MOUNTED HYDROGEN SUPPLY METHOD AND DEVICE FOR HYDROGEN-RICH SMELTING IN BLAST FURNACE OR SHAFT FURNACE

This patent application is a U.S. national stage filing under 35 U.S.C. § 371 of PCT International Application No. PCT/CN2022/086287 filed Apr. 12, 2022 (published as WO 2023/015924 on Feb. 16, 2023), which claims priority to and the benefit of Chinese Patent Application No. 202110926501.2 filed Aug. 12, 2021. The entire contents of these applications are incorporated herein by reference.

TECHNICAL FIELD

The disclosure belongs to the field of hydrogen-rich metallurgical technologies, and in particular relates to a vehicle-mounted hydrogen supply method and device for hydrogen-rich smelting in a blast furnace or shaft furnace.

BACKGROUND

In order to cope with global climate change and reduce $CO_2$ greenhouse gas emissions, low-carbon production has become a focus of social attention. China plans to peak $CO_2$ emissions before 2030 and strive to achieve carbon neutrality by 2060. The steel industry is an important responsible entity in implementing carbon reduction targets and a core participant in the carbon trading market. During the entire process of steel production, the $CO_2$ emissions from the blast furnace or shaft furnace iron-making process account for about 80%. Therefore, the blast furnace or shaft furnace iron-making process is the process with the maximum $CO_2$ emissions, is also the core of emission reduction, and has a decisive impact on carbon reduction. The development and application of the low-carbon smelting technology in the blast furnace or shaft furnace process are urgent. Hydrogen is used instead of carbon in the smelting process, and the hydrogen reaction product is water, thus significantly reducing the $CO_2$ emissions and fundamentally achieving the low-carbon smelting in blast furnaces. At present, there are over 1000 blast furnaces or shaft furnaces in China. However, no suitable method or mature approach has been found to conduct hydrogen-rich smelting testing and production for safe and stable hydrogen supply in the blast furnace smelting process. Moreover, most steel plants do not have coking plants, so it is impossible to provide hydrogen sources for blast furnaces up close. The cost of building a new hydrogen plant is too high, and the construction period is long. At present, the hydrogen production technology is not yet mature, the hydrogen production technology changes rapidly, the cost of hydrogen plant upgrading and transforming in the later stage is high, and it is not conducive to safe and stable hydrogen supply for the blast furnace smelting process.

SUMMARY

The disclosure provides a vehicle-mounted hydrogen supply method and device for hydrogen-rich smelting in a blast furnace or shaft furnace.

The technical solutions of the disclosure are as follows:

A vehicle-mounted hydrogen supply method for hydrogen-rich smelting in a blast furnace or shaft furnace includes the following steps:

S1: establishing a plurality of designated working parking spaces at designated positions in or near a steel smelting plant;

S2: computing the number N1 of hydrogen transport apparatuses in transit and the number N2 of hydrogen transport apparatuses that can supply hydrogen normally in dedicated parking spaces according to a distance between a hydrogen supply station and the designated working parking spaces and daily hydrogen demand of the steel smelting plant, where N2>3;

S3: dividing the hydrogen transport apparatuses that can supply hydrogen normally in the designated working parking spaces into working long pipe vehicles and standby long pipe vehicles, where at least two working long pipe vehicles are provided, namely a first working long pipe vehicle and a second working long pipe vehicle, and at least one standby long pipe vehicle is provided; dividing hydrogen long pipe vehicles in transit into fully-loaded long pipe vehicles and no-load long pipe vehicles according to the hydrogen content therein; and S4: respectively connecting the two working long pipe vehicles to a pressure reducing system; reducing the pressure of high pressure hydrogen in the first working long pipe vehicle by the pressure reducing system, and then, injecting the high pressure hydrogen with the pressure reduced into an injection system, in a case that a hydrogen pressure value in the first working long pipe vehicle is lower than a set pressure supply value, opening an intake pipeline of the second working long pipe vehicle, and cutting off an intake pipeline of the first working long pipe vehicle; at the same time, connecting the cut-off intake pipeline to the standby long pipe vehicle to become a new working long pipe vehicle; at this time, marking the first working long pipe vehicle whose hydrogen supply is cut off as a no-load long pipe vehicle, and immediately driving the vehicle out of the steel smelting plant towards the hydrogen supply station for adding hydrogen; before a hydrogen pressure value in the second working long pipe vehicle is lower than the set pressure supply value, enabling at least one fully-loaded long pipe vehicle in transit to enter the steel smelting plant and stop in the designated working parking space to become a standby long pipe vehicle; and achieving vehicle-mounted cyclic hydrogen supply.

Preferably, at least three designated dedicated parking spaces are arranged in the steel smelting plant for parking two working long pipe vehicles and one standby long pipe vehicle; and at least two intake pipelines connected to the hydrogen pressure reducing system are provided, and the intake pipeline is connected to a hydrogen outlet of the working long pipe vehicle through an intake hose provided with a stop valve.

Preferably, the vehicle-mounted hydrogen supply method for hydrogen-rich smelting in a blast furnace or shaft furnace according to claim 1 is characterized in that the hydrogen pressure reducing system includes two stop valve pressure reducers connected to two intake pipelines respectively, and the stop valve pressure reducers are alternately used to achieve continuous pressure reduction supply of hydrogen.

Preferably, the set pressure supply value is 15 bar.

A vehicle-mounted hydrogen supply device for hydrogen-rich smelting in a blast furnace or shaft furnace includes:

hydrogen transport apparatuses, configured to transport hydrogen from a hydrogen supply station to a steel smelting plant, and at least including a first working long pipe vehicle, a second working long pipe vehicle and a standby long pipe vehicle, where the first working long pipe vehicle, the second working long pipe vehicle and the standby long pipe vehicle can supply hydrogen normally and are all located in designated working parking spaces of the steel smelting plant;

a pressure reducing system, including an intake pipeline, a pressure reducing pipeline and an output pipeline connected in sequence, where the output pipeline includes an output main pipe;

the intake pipeline at least includes a first intake branch and a second intake branch; input ends of the first intake branch and the second intake branch are respectively connected to the first working long pipe vehicle and the second working long pipe vehicle, and the first intake branch and the second intake branch are both provided with a manual butterfly valve and a first stop valve;

the pressure reducing pipeline at least includes a first pressure reducing branch and a second pressure reducing branch; input ends of the first pressure reducing branch and the second pressure reducing branch communicate with each other and are connected to the output ends of the first intake branch and the second intake branch, and output ends of the first pressure reducing branch and the second pressure reducing branch communicate with each other and are connected to an input end of the output main pipe;

the output main pipe is provided with a first check valve and a rapid cut-off valve in sequence, one end is connected to the output ends of the first pressure reducing branch and the second pressure reducing branch, and the other end is connected to an injection system;

the injection system, including an annular main pipe connected to an output end of the output main pipe, where an output end of the annular main pipe is provided with a plurality of injection branch pipes, and each injection branch pipe is connected to a tuyere of the blast furnace through a metal hose and a fire arrestor; and a control system, including a transport computing module and a pressure reducing control module, where the transport computing module computes the number of hydrogen long pipe vehicles in transit according to an inputted distance between the hydrogen supply station and the steel smelting plant and daily hydrogen demand of the steel smelting plant; and the pressure reducing control module cyclically opens the first pressure reducing branch and the second pressure reducing branch according to the pressure value of the intake pipeline.

Preferably, the pressure reducing system further includes a nitrogen protection pipeline, and the nitrogen protection pipeline includes a nitrogen input branch and a nitrogen output branch; the nitrogen input branch is provided with a first pressure regulating apparatus, a second check valve, a second stop valve and a first cold angle valve in sequence, one end is connected to a nitrogen supply apparatus, and the other end is connected to an output end of a first intake pipeline; and the nitrogen output branch is provided with a second cold angle valve, a concentric reducer and a bleeding valve in sequence, and an input end of the nitrogen output branch is connected to the input end of the first pressure reducing branch.

Preferably, the pressure reducing pipeline further includes standby pressure reducing branches connected in parallel at both ends of the first pressure reducing branch and the second pressure reducing branch, and the first pressure reducing branch and the second pressure reducing branch are both provided with a third stop valve, a second pressure regulating apparatus and a first needle valve in sequence; and the standby pressure reducing branches are both provided with a fourth stop valve and a second needle valve in sequence.

Preferably, the first pressure regulating apparatus and the second pressure regulating apparatus both include a pressure regulating valve and a spring safety valve, the pressure regulating valve is configured to automatically eliminate a residual pressure head of a pipeline and a flow deviation caused by pressure fluctuation, one end of the spring safety valve is connected to the pressure regulating valve, and the other end is connected between the second cold angle valve and the concentric reducer of the nitrogen output branch; and input ends of the needle valves of the first pressure reducing branch, the second pressure reducing branch and the third pressure reducing branch are all connected between the second cold angle valve and the concentric reducer of the nitrogen output branch through stop valves.

Preferably, a tail end of a branch pipe at the output end of the second pressure reducing branch is provided with a third cold angle valve, a tail end of a branch pipe of the first pressure reducing branch is provided with a fifth stop valve and a sixth pressure gauge, the sixth pressure gauge detects the output pipeline pressure of the pressure reducing pipeline when the fifth stop valve is opened, and the output end of the first pressure reducing branch is connected to an output end of the concentric reducer through a sixth stop valve and a third spring safety valve.

Preferably, the rapid cut-off valve of the output main pipe is provided with a pressure control valve, and an output end of the pressure control valve is connected between the third spring safety valve and the concentric reducer.

Compared with the prior art, the disclosure has the advantages that:

1. The vehicle-mounted hydrogen supply method and device for hydrogen-rich smelting in a blast furnace or shaft furnace provided by the disclosure combine steel plant hydrogen supply requirements with vehicle-mounted hydrogen supply technologies used by hydrogen-powered vehicles in the field of transportation to construct a vehicle-mounted hydrogen supply system applied to hydrogen-rich smelting in a blast furnace or shaft furnace, thus providing an effective and reliable pathway for safe and stable hydrogen supply in a blast furnace or shaft furnace smelting process to perform hydrogen-rich smelting testing and production. Compared with a newly-built hydrogen plant, the invested construction cost is low, the operation flow is simple, the method and device are not limited by technical upgrading and transformation, and the flexibility is high. At the same time, two hydrogen long pipe vehicles as working stations and two intake pressure reducing valves are used for solving the problem of continuous hydrogen supply required for hydrogen-rich smelting in a blast furnace. As the hydrogen production technology is not yet mature, hydrogen plant construction is difficult. The use of a vehicle-mounted hydrogen supply system for hydrogen supply not only solves the problem of supplying a hydrogen source for hydrogen-rich smelting, but also allows for adapting to changes in rapid development of the hydrogen power technology.

2. According to the vehicle-mounted hydrogen supply method and device for hydrogen-rich smelting in a blast furnace or shaft furnace provided by the disclosure, the intake pipeline of the pressure reducing system adopts the design of arranging at least two intake branches, the pressure reducing pipeline adopts the design of double loops with bypasses, and one output main pipe is used to achieve continuous hydrogen supply. At the same time, the nitrogen protection pipeline is arranged to purge the intake pipeline, the pressure reducing pipeline and the output pipeline, and can replace hydrogen in emergency situations to improve the hydrogen supply safety. Moreover, spring safety valves are arranged in multiple places in the pressure reducing system to ensure that the system pressure does not exceed the standard, thus further ensuring the safety of the pressure reducing system. A connecting port between the working long pipe vehicle and the intake branch is specially provided with a dual-cut-off valve composed of the manual butterfly valve and the stop valve to ensure effective hydrogen cut-off. Based on the characteristics of blast furnace smelting, the pressure reducing system ensures continuous hydrogen supply and ensures the safety and stability of the system at the same time, thus providing a safe and reliable technical route for blast furnace injection of hydrogen.

Figure 1:
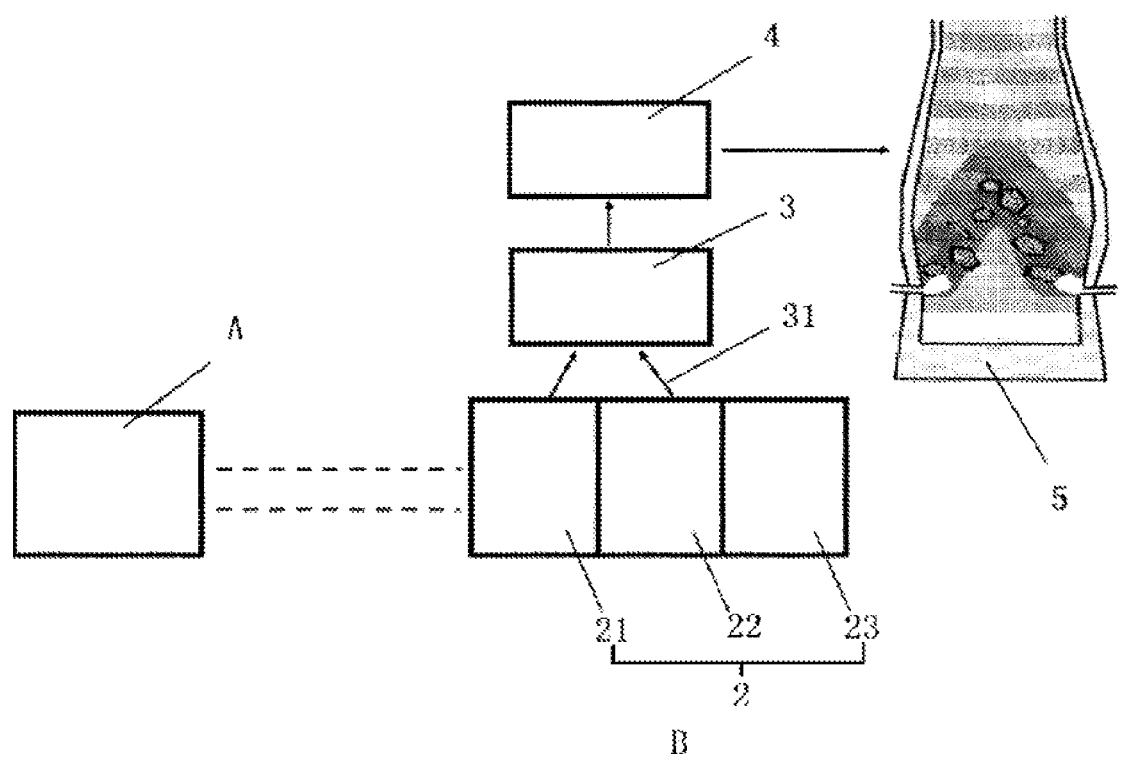
FIG. 1 is a schematic process flow diagram of a vehicle-mounted hydrogen supply method and device for hydrogen-rich smelting in a blast furnace or shaft furnace provided by the disclosure.

Numbers in the figures respectively represent:
A—hydrogen supply station, B—steel smelting plant,
1—hydrogen transport apparatus, 11—first working long pipe vehicle, 12—second working long pipe vehicle,
2—designated working parking space, 21—first working long pipe vehicle parking space, 22—second working long pipe vehicle parking space, 23—standby long pipe vehicle parking space,
3—pressure reducing system,
31—intake pipeline, 311—first intake branch, 312—second intake branch,
32—pressure reducing pipeline, 321—first pressure reducing branch, 322—second pressure reducing branch, 323—standby pressure reducing branch,
33—output pipeline, 331—output main pipe,
34—nitrogen protection pipeline, 341—nitrogen input branch, 342—nitrogen output branch, 343—nitrogen supply apparatus,
35—manual butterfly valve,
361—first stop valve, 362—second stop valve, 363—third stop valve, 364—fourth stop valve, 365—fifth stop valve, 366—sixth stop valve,
371—first check valve, 372—second check valve,
38—rapid cut-off valve,
391—first pressure regulating apparatus, 3911—first pressure regulating valve, 3912—first spring safety valve, 392—second pressure regulating apparatus, 3921—second pressure regulating valve, 3922—second spring safety valve, 393—third spring safety valve,
61—first cold angle valve, 62—second cold angle valve, 63—third cold angle valve, 7—concentric reducer, 8—bleeding valve, 91—first needle valve, 92—second needle valve,
4—injection system, 41—hydrogen injection pipeline, 411—hydrogen buffer tank, 412—first manual ball valve, 413—third check valve, 414—first dual-pneumatic cut-off ball valve, 415—filter, 416—second manual ball valve, 417—first pneumatic regulating ball valve, 418—third manual ball valve, 419—first pneumatic cut-off ball valve, 410—fourth check valve, 4101—first flow orifice plate,
42—nitrogen spray pipeline, 42a—first nitrogen spray branch pipe, 42b—second nitrogen spray branch pipe, 421—seventh manual ball valve, 422—second pneumatic cut-off ball valve, 423—seventh check valve, 424—second dual-pneumatic cut-off ball valve, 425—third pneumatic cut-off ball valve, 426—third flow orifice plate, 427—eighth check valve,
43—annular main pipe, 431—hydrogen ring pipe, 432—nitrogen ring pipe, 433—fourth manual ball valve, 434—first bleeding opening, 435—seventh stop valve, 436—fourth spring safety valve, 4311—hydrogen branch pipe, 4312—fifth manual ball valve, 4313—first blind flange valve, 4314—fifth check valve, 4315—pneumatic three-way ball valve, 4316—fifth manual ball valve, 4317—second flow orifice plate, 4318—second pneumatic regulating ball valve, 4319—sixth check valve, 4321—nitrogen branch pipe, 4322—eighth manual ball valve, 4323—second blind flange valve, 4324—ninth check valve, 4325—reducer pipe, 5—blast furnace or shaft furnace, 51—metal hose, 52—fire arrestor, 53—sixth manual ball valve, and 54—dual-manual ball valve.

DETAILED DESCRIPTION

For the convenience of understanding the disclosure, the disclosure will be described in more detail below with reference to the accompanying drawings and specific examples.

A flowchart of a vehicle-mounted hydrogen supply method for hydrogen-rich smelting in a blast furnace or shaft furnace, as shown in FIG. 1, includes the following steps:

S1: a plurality of designated working parking spaces 2 are established at designated positions in or near a steel smelting plant B, where the designated position needs to meet the shortest distance required for safe production of steel smelting;

S2: the number N1 of hydrogen transport apparatuses 1 in transit and the number N2 of hydrogen transport apparatuses that can supply hydrogen normally in dedicated parking spaces are computed according to a distance between a hydrogen supply station A and the designated working parking spaces 2 and daily hydrogen demand of the steel smelting plant B, where N2>3;

S3: the hydrogen transport apparatuses 1 that can supply hydrogen normally in the dedicated parking spaces are divided into working long pipe vehicles and standby long pipe vehicles, where at least two working long pipe vehicles are provided, namely a first working long pipe vehicle 11 and a second working long pipe vehicle 12, and at least one standby long pipe vehicle is provided; hydrogen long pipe vehicles in transit are divided into fully-loaded long pipe vehicles and no-load long pipe vehicles according to the hydrogen content therein; and S4: the two working long pipe vehicles are respectively connected to a pressure reducing system 3; the pressure of high pressure hydrogen in the first working long pipe vehicle 11 is reduced by the pressure reducing system 3, and then, the high pressure hydrogen with the pressure reduced is injected into an injection system 4, in a case that a hydrogen pressure value in the first working long pipe vehicle 11 is lower than a set pressure supply value, an intake pipeline of the second working long pipe vehicle 12 is opened, and an intake pipeline of the first working long pipe vehicle 11 is cut off; at the same time, the cut-off intake pipeline is connected to the standby long pipe vehicle to become a new working long pipe vehicle; at this time, the first working long pipe vehicle 11 whose hydrogen supply is cut off is marked as a no-load long pipe vehicle, and the vehicle is immediately driven out of the steel smelting plant B towards the hydrogen supply station A for adding hydrogen; before a hydrogen pressure value in the second working long pipe vehicle 12 is lower than the set pressure supply value, at least one fully-loaded long pipe vehicle in transit is enabled to enter the steel smelting plant and stop in the designated working parking space 2 to become a standby long pipe vehicle; and vehicle-mounted cyclic hydrogen supply is achieved.

Figure 2:
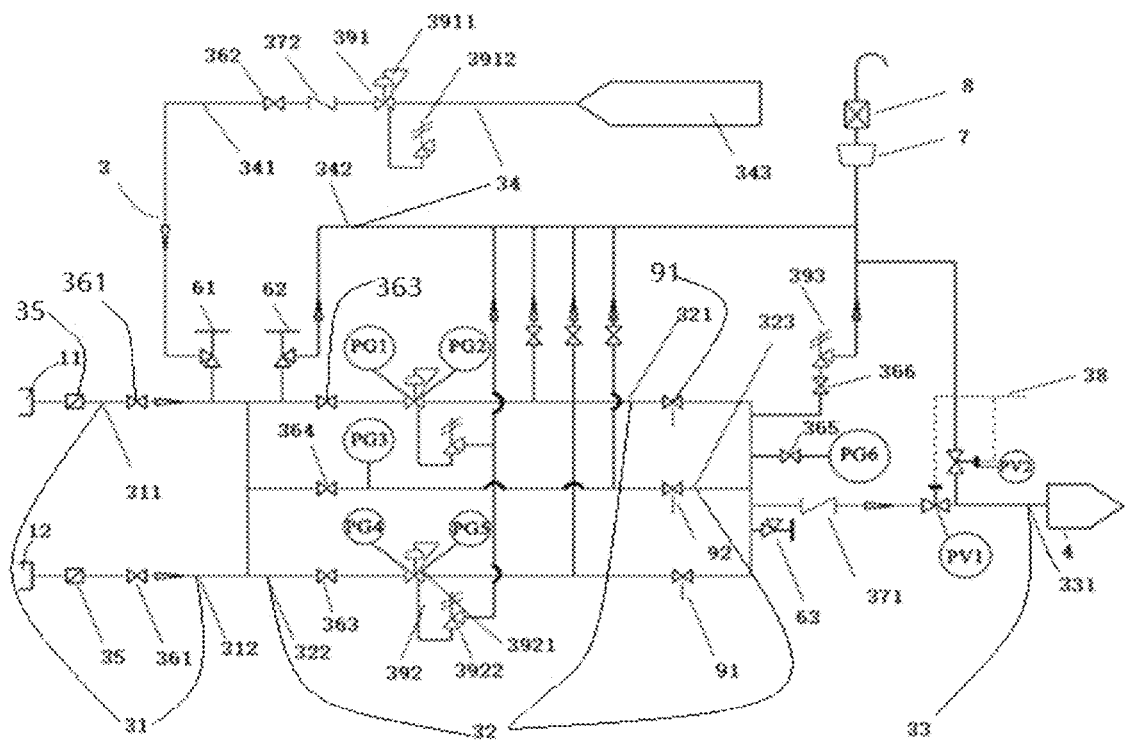
FIG. 2 is a schematic process flow diagram of a pressure reducing system for the vehicle-mounted hydrogen supply method and device for hydrogen-rich smelting in a blast furnace or shaft furnace provided by the disclosure.

Compressed pure hydrogen is directly purchased from the hydrogen supply station A of a commercial gas company, high pressure hydrogen is transported to a destination, namely the steel smelting plant B using the hydrogen transport apparatuses 1, such as hydrogen long pipe vehicles, and the hydrogen long pipe vehicles are parked in the dedicated designated parking spaces 2 of the hydrogen long pipe vehicles, such as a first working long pipe vehicle parking space 21, a second working long pipe vehicle parking space 22 and a standby long pipe vehicle parking space 23, as shown in FIG. 2. After the pressure in the first working long pipe vehicle 11 is reduced to about 15 bar, the intake pipeline of the second working long pipe vehicle 12 is opened, and the intake pipeline of the first working long pipe vehicle 11 is cut off to complete continuous hydrogen supply switching; and continuous hydrogen supply is maintained by cyclic continuous hydrogen supply switching. After the pressure of the high pressure hydrogen is reduced by the pressure reducing system, the hydrogen is injected into a blast furnace or shaft furnace 5 by a pipeline transport supply injection system for hydrogen-rich smelting.

Preferably, at least three designated working parking spaces 2 are arranged in the steel smelting plant B for parking two working long pipe vehicles and one standby long pipe vehicle; and the working long pipe vehicles are all connected to a pressure reducing pipeline 32 of the hydrogen pressure reducing system 3 by an intake pipeline 31.

Preferably, the hydrogen pressure reducing pipeline 32 is provided with two stop valve pressure reducers connected in parallel, the stop valve pressure reducer includes a stop valve and a pressure regulating valve, one end of the hydrogen pressure reducing pipeline 32 is connected to two intake pipelines, and the other end is connected to the injection system; and the two stop valve pressure reducers are alternately used to achieve continuous pressure reduction supply of hydrogen.

Preferably, the set pressure supply value is 15 bar.

Figure 3:
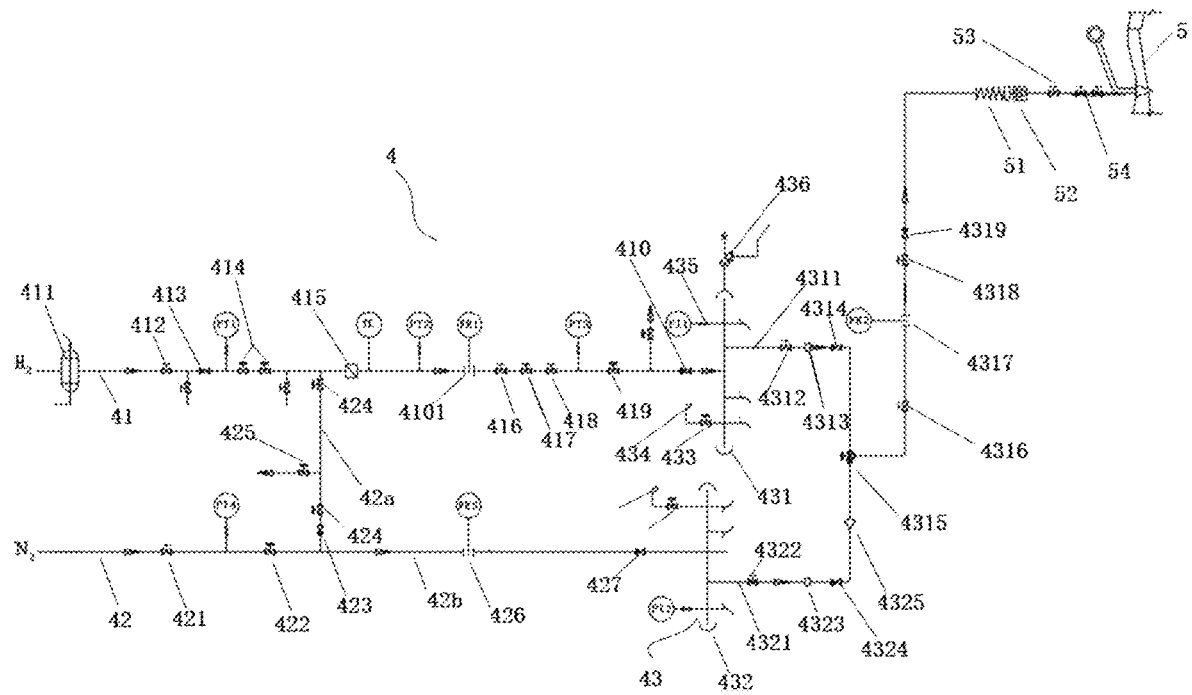
FIG. 3 is a schematic process flow diagram of an injection system for the vehicle-mounted hydrogen supply method and device for hydrogen-rich smelting in a blast furnace or shaft furnace provided by the disclosure.

A vehicle-mounted hydrogen supply device for hydrogen-rich smelting in a blast furnace or shaft furnace is subjected to hydrogen-rich smelting in the blast furnace or shaft furnace by using the above method. A modular block diagram of the device is shown in FIG. 2, including:

hydrogen transport apparatuses 1, configured to transport hydrogen from a hydrogen supply station A to a steel smelting plant B, and at least including a first working long pipe vehicle 11, a second working long pipe vehicle 12 and a standby long pipe vehicle, where the first working long pipe vehicle, the second working long pipe vehicle and the standby long pipe vehicle can supply hydrogen normally and are all located on a first working long pipe vehicle parking space 21, a second working long pipe vehicle parking space 22 and a standby long pipe vehicle parking space 23 of designated working parking spaces 2 of the steel smelting plant B;

a pressure reducing system 3, as shown in FIG. 3, including an intake pipeline 31, a pressure reducing pipeline 32 and an output pipeline 33 connected in sequence, where the output pipeline 33 includes an output main pipe 331, where the intake pipeline 31 at least includes a first intake branch 311 and a second intake branch 312; an input end of the first intake branch 311 is connected to the first working long pipe vehicle 11; an input end of the second intake branch 312 is connected to the second working long pipe vehicle 12; the first intake branch 311 and the second intake branch 312 are both provided with a manual butterfly valve 35 and a first stop valve 361; after the pressure in the first working long pipe vehicle 11 is reduced to about 15 bar, a first stop valve 361$b$ on the second intake branch 312 connected to the second working long pipe vehicle 12 is opened, a first stop valve 361$a$ on the first intake branch 311 connected to the first working long pipe vehicle 11 is closed, and at the same time, the first working long pipe vehicle 11 whose hydrogen supply is cut off is marked as a no-load long pipe vehicle, and the vehicle is immediately driven out of the steel smelting plant B towards the hydrogen supply station A for adding hydrogen; the cut-off first intake branch 311 is connected to the standby long pipe vehicle to become a new first working long pipe vehicle 11 to complete a hydrogen supply switching process; before a hydrogen pressure value in the second working long pipe vehicle 12 is lower than a set pressure supply value, at least one fully-loaded long pipe vehicle in transit is enabled to enter the steel smelting plant and stop in the designated working parking space 2 to become a standby long pipe vehicle; as the next hydrogen supply switching, after the pressure in the second working long pipe vehicle 12 is reduced to about 15 bar, the first stop valve 361$a$ on the first intake branch 311 connected to the first working long pipe vehicle 11 is opened, the first stop valve 361$b$ on the second intake branch 312 connected to the second working long pipe vehicle 12 is closed, and at the same time, the first working long pipe vehicle 11 whose hydrogen supply is cut off is marked as a no-load long pipe vehicle, and the vehicle is immediately driven out of the steel smelting plant B towards the hydrogen supply station A for adding hydrogen; and the cut-off first intake branch 311 is connected to the next standby long pipe vehicle;

the pressure reducing pipeline 32 at least includes a first pressure reducing branch 321 and a second pressure reducing branch 322; input ends of the first pressure reducing branch 321 and the second pressure reducing branch 322 communicate with each other and are connected to output ends of the first intake branch 311 and the second intake branch 312, and output ends of the first pressure reducing branch 321 and the second pressure reducing branch 322 communicate with each other and are connected to an input end of the output main pipe 331; during operation, one of the first pressure reducing branch 321 and the second pressure reducing branch 322 is in an opened state, and the other is in a closed state, thus facilitating the maintenance and ensuring that continuous hydrogen supply will not be interrupted due to problems of pressure reducing branches; and the output main pipe 331 is provided with a first check valve 371 and a rapid cut-off valve 38 in sequence, one end of the output main pipe 331 is connected to the output ends of the first pressure reducing branch 321 and the second pressure reducing branch 322, and the other end is connected to an injection system 4; if the gas in the blast furnace or shaft furnace 5 flows backward, the rapid cut-off valve 38 will sound a high alarm, and the output main pipe 331 of the rapid cut-off valve will urgently cut off the gas flow;

the injection system 4, including an annular main pipe 43 connected to an output end of the output main pipe 331, where an output end of the annular main pipe 43 is provided with a plurality of injection branch pipes, and each injection branch pipe is connected to a tuyere of the blast furnace or shaft furnace 5 through a metal hose and a fire arrestor; and a control system, including a transport computing module and a pressure reducing control module, where the transport computing module computes the number of hydrogen transport apparatuses in transit according to an inputted distance between the hydrogen supply station A and the steel smelting plant B and daily hydrogen demand of the steel smelting plant B; and the pressure reducing control module cyclically opens the first pressure reducing branch 321 and the second pressure reducing branch 322 according to the pressure value of the intake pipeline 31.

Preferably, the pressure reducing system 3 further includes a nitrogen protection pipeline 34, and the nitrogen protection pipeline 34 is used for purging and switching all hydrogen in the pipeline of the pressure reducing system 3 to nitrogen in emergency situations to ensure the system safety. The nitrogen protection pipeline 34 includes a nitrogen input branch 341 and a nitrogen output branch 342. The nitrogen input branch 341 is provided with a first pressure regulating apparatus 391, a second check valve 372, a second stop valve 362 and a first cold angle valve 61 in sequence. One end of the nitrogen input branch 341 is connected to a nitrogen supply apparatus 343, and the other end is connected to the output end of the first intake branch 311. Thus, nitrogen starts purging from an input end of the pressure reducing pipeline 32, which is beneficial for nitrogen to blow the entire pressure reducing system clean. The nitrogen output branch 342 is provided with a second cold angle valve 62, a concentric reducer 7 and a bleeding valve 8 in sequence. An input end of the nitrogen output branch 342 is connected to the input end of the first pressure reducing branch 321. When the pipeline pressure is too high, nitrogen or hydrogen can be released from the nitrogen output branch 342. Preferably, the pressure reducing pipeline 32 further includes standby pressure reducing branches 323 connected in parallel at both ends of the first pressure reducing branch 321 and the second pressure reducing branch 322. If the first pressure reducing branch 321 and the second pressure reducing branch 322 both need to be shut down for maintenance, the standby pressure reducing branches 323 can be temporarily activated to ensure that the entire system can maintain continuous hydrogen supply. The first pressure reducing branch 321 and the second pressure reducing branch 322 are both provided with a third stop valve 363, a second pressure regulating apparatus 392 and a first needle valve 91 in sequence, so that when the pressure is too high, the gas can be released. The standby pressure reducing branch 323 is provided with a fourth stop valve 364 and a second needle valve 92 in sequence, and a pressure gauge PG3 is arranged between the fourth stop valve 364 and the second needle valve 92, thus facilitating the regulation and control of the gas flow.

Preferably, the first pressure regulating apparatus 391 includes a first pressure regulating valve 3911 and a first spring safety valve 3912, and the two second pressure regulating apparatuses 392 both include a second pressure regulating valve 3921 and a second spring safety valve 3922, where the function of the pressure regulating valve is to automatically eliminate a residual pressure head of a pipeline and a flow deviation caused by pressure fluctuation to maintain the set flow regardless of how the pressure of the entire system changes. The back of each second pressure regulating valve 3921 is provided with two pressure gauges, referring to PG1/PG2/PG4/PG5 in FIG. 2. One of the two pressure gauges arranged on the pressure regulating valve is connected to a filter pressure reducer of the pressure regulating valve, and the other is connected to a locator of the pressure regulating valve. The pressure gauge connected to the filter pressure reducer of the pressure regulating valve is configured to display the rated pressure of the locator. When a displayed value of the pressure gauge connected to the locator of the pressure regulating valve is lower than the rated pressure, the locator cannot perform accurate location and regulation. The pressure gauge connected to the locator of the pressure regulating valve is configured to display and regulate the specific situation of the locator, so as to achieve an automatic regulation function. An input end of the first spring safety valve 3912 is connected to the first pressure regulating valve 3911, and an output end is connected between the second cold angle valve 62 and the concentric reducer 7 of the nitrogen output branch 342. The second cold angle valve 62 is automatically opened when the pressure in the pressure reducing system is too high, so that the gas can be released. An input end of the second spring safety valve 3922 is connected to the second pressure regulating valve 3921, and an output end of the second spring safety valve 3922 is connected to an output end of the first spring safety valve 3912, and connected between the second cold angle valve 62 and the concentric reducer 7 of the nitrogen output branch 342, so that when the pressure is too high, the gas can be released. Input ends of needle valves (91, 92) of the first pressure reducing branch 321, the second pressure reducing branch 322 and the standby pressure reducing branches 323 are all connected between the second cold angle valve 62 and the concentric reducer 7 of the nitrogen output branch 342 through stop valves (363, 364). During nitrogen purging, gases in the first pressure reducing branch 321, the second pressure reducing branch 322 and the standby pressure reducing branches 323 are respectively purged from three branches where the stop valves (363, 364) are located.

A tail end of a branch pipe at the output end of the second pressure reducing branch 322 is provided with a third cold angle valve 63, and the function of the third cold angle valve 63 is to purge and clean the solid-liquid deposition inside the pressure reducing system pipeline and discharge the solid-liquid deposition from the pipeline system. A tail end of a branch pipe of the first pressure reducing branch 321 is provided with a fifth stop valve 365 and a pressure gauge PG6. The pressure gauge PG6 detects the output pipeline pressure of the pressure reducing pipeline 32 when the fifth stop valve 365 is opened, and the output end of the first pressure reducing branch 321 is connected to an output end of the concentric reducer 7 through a sixth stop valve 366 and a third spring safety valve 393. Preferably, the rapid cut-off valve 38 of the output main pipe 331 includes two pressure control valves, an input end of a first pressure control valve PV1 is connected to the first check valve 371, and an output end is connected to an input end of a second pressure control valve PV2. The first pressure control valve PV1 and the second pressure control valve PV2 are both rapid cut-off valves. An output end of the second pressure control valve PV2 is connected between the third spring safety valve 393 and the concentric reducer 7. The rapid cut-off valve PV2 mounted on the nitrogen output branch 342 is interlocked with the pressure of a hydrogen buffer tank, causing a high pressure alarm. When the pressure is high, the pressure control valve PV1 is cut off, and the pressure control valve PV2 is opened.

Preferably, dual-cut-off valves are used at a junction of each pipeline to ensure effective cut-off.

Preferably, the material selection of the above valves, pipelines and other materials meets specification requirements, and the pipeline flow rate is controlled within the range of the specification requirements.

Before the intake pipeline 31 is opened, all manual butterfly valves on the intake pipeline 31 are kept closed at first, the nitrogen protection pipeline 34 is opened, purging is performed, and whether there is gas leakage at each connecting port is checked.

The nitrogen protection pipeline 34 is closed, dual-cut-off valves (namely the manual butterfly valve 35 and the first stop valve 361 in FIG. 2) connecting the first intake branch 311 and the first working long pipe vehicle 11 are opened, and dual-cut-off valves connecting the second intake branch 312 and the second working long pipe vehicle 12 are kept closed. Hydrogen is blown into the first pressure reducing branch 321 through the first intake branch 311, and the hydrogen flow is regulated by the second pressure regulating apparatus 392. The hydrogen after pressure relief is blown into the hydrogen output main pipe 331, and is respectively outputted to the injection system through the first check valve 371 and the rapid cut-off valve 38.

Preferably, the injection system 4 includes a hydrogen injection pipeline 41 and a nitrogen spray pipeline 42. The hydrogen injection pipeline 41 is configured to control the flow of the hydrogen outputted from the pressure reducing system. The hydrogen injection pipeline 41 is provided with a hydrogen buffer tank 411, a first manual ball valve 412, a third check valve 413, a pressure transducer PT1, a first dual-pneumatic cut-off ball valve 414, a filter 415, a thermometer TE, a pressure transducer PT2, a first flow meter FE1, a second manual ball valve 416, a first pneumatic regulating ball valve 417, a third manual ball valve 418, a pressure transducer PT3, a first pneumatic cut-off ball valve 419 and a fourth check valve 410 in sequence. A nitrogen purging apparatus is connected between the first manual ball valve 412 and the third check valve 413, and a nitrogen purging apparatus is connected between the first dual-pneumatic cut-off ball valve 414 and the filter 415. The flow meter FE1 detects the hydrogen flow through a first flow orifice plate 4101 arranged between the pressure transducer PT2 and the second manual ball valve 416.

The annular main pipe 43 includes a hydrogen ring pipe 431 and a nitrogen ring pipe 432. After the pressure of hydrogen is reduced by the pressure reducing system 3, the flow of the hydrogen is controlled by the hydrogen injection pipeline 41, and then, the hydrogen is blown into the hydrogen ring pipe 431 and then distributed into a plurality of hydrogen branch pipes 4311 of the hydrogen ring pipe 431. The hydrogen ring pipe 431 is connected with a first bleeding opening 434 through a fourth manual ball valve 433 and connected with a pressure gauge PI1 through a seventh stop valve 435, and the hydrogen ring pipe 431 is provided with a fourth spring safety valve 436. Each hydrogen branch pipe 4311 is provided with a fifth manual ball valve 4312, a first blind flange valve 4313, a fifth check valve 4314, a pneumatic three-way ball valve 4315, a fifth manual ball valve 4316, a second flow orifice plate 4317, a second pneumatic regulating ball valve 4318 and a sixth check valve 4319 in sequence. The second flow orifice plate 4317 is further provided with a second flow meter FE2 for monitoring the flow of the hydrogen branch pipes.

A connecting part between the hydrogen branch pipe 4311 and a tuyere spray gun of the blast furnace 5 is provided with a metal hose 51, a fire arrestor 52, a sixth manual ball valve 53 and a dual-manual ball valve 54 in sequence for preventing gun burning due to backfire.

The nitrogen spray pipeline 42 is provided with a seventh manual ball valve 421 and a second pneumatic cut-off ball valve 422, and a pressure transducer PT4 is further arranged between the seventh manual ball valve 421 and the second pneumatic cut-off ball valve 422.

The nitrogen spray pipeline 42 behind the second pneumatic cut-off ball valve 422 is divided into a first nitrogen spray branch pipe 42a and a second nitrogen spray branch pipe 42b. The first nitrogen spray branch pipe 42a is connected to the hydrogen injection pipeline 41 to purge the hydrogen injection pipeline 41. The first nitrogen spray branch pipe 42a is provided with a seventh check valve 423 and a second dual-pneumatic cut-off ball valve 424 in sequence, and a third pneumatic cut-off ball valve 425 for pressure relief is further arranged between the second dual-pneumatic cut-off ball valve 424.

The second nitrogen spray branch pipe 42b is connected to the nitrogen ring pipe 432 through a third flow orifice plate 426 and an eighth check valve 427, and the third flow orifice plate 426 is further provided with a third flow meter PE3.

The second nitrogen spray branch pipe 42b is configured to purge the hydrogen ring pipe 431 and each hydrogen branch pipe 4311.

The nitrogen in the second nitrogen spray branch pipe 42b is distributed to a plurality of nitrogen branch pipes 4321 through the nitrogen ring pipe 432. The structure of the nitrogen ring pipe 432 is identical to the structure of the hydrogen ring pipe 431. The nitrogen branch pipe 4321 is provided with an eighth manual ball valve 4322, a second blind flange valve 4323, a ninth check valve 4324 and a reducer pipe 4325.

The nitrogen ring pipe 432 is parallel to the hydrogen ring pipe 431, and the nitrogen branch pipes 4321 are parallel to the hydrogen branch pipes 4311. Each hydrogen branch pipe 4311 has a corresponding nitrogen branch pipe 4321 for nitrogen purging to replace hydrogen in emergency situations. The nitrogen branch pipe 4321 is connected to the hydrogen branch pipe 4311 through the pneumatic three-way ball valve 4315.

It should be noted that the specific implementations described above can enable those skilled in the art to have a more comprehensive understanding of the disclosure, but do not limit the disclosure in any way. Therefore, although the specification describes the disclosure in detail with reference to the accompanying drawings and examples, those skilled in the art should understand that modifications or equivalent replacements can still be made to the disclosure. In short, all technical solutions and changes thereof that do not depart from the spirit and scope of the disclosure shall be included within the scope of protection of the disclosure.

What is claimed is:

1. A vehicle-mounted hydrogen supply method for hydrogen-rich smelting in a blast furnace or shaft furnace, comprising the following steps:
   S1: establishing a plurality of designated working parking spaces at designated positions in or near a steel smelting plant;
   S2: computing the number N1 of hydrogen transport apparatuses in transit and the number N2 of hydrogen transport apparatuses that can supply hydrogen in dedicated parking spaces according to a distance between a hydrogen supply station and the designated working parking spaces and daily hydrogen demand of the steel smelting plant, wherein N≥3;
   S3: dividing the hydrogen transport apparatuses that can supply hydrogen in the designated working parking spaces into working long pipe vehicles and standby long pipe vehicles, wherein at least two working long pipe vehicles are provided, including a first working long pipe vehicle and a second working long pipe vehicle, and at least one standby long pipe vehicle is provided; dividing hydrogen long pipe vehicles in transit into fully-loaded long pipe vehicles and no-load long pipe vehicles according to the hydrogen content therein; and
   S4: respectively connecting the two working long pipe vehicles to a pressure reducing system; reducing the pressure of high pressure hydrogen in the first working long pipe vehicle by the pressure reducing system, and then, injecting the high pressure hydrogen with the pressure reduced into an injection system, in a case that a hydrogen pressure value in the first working long pipe vehicle is lower than a set pressure supply value, opening an intake pipeline of the second working long pipe vehicle, and cutting off an intake pipeline of the first working long pipe vehicle; at the same time, connecting the intake pipeline that was cut off to the standby long pipe vehicle to become a new working long pipe vehicle; at this time, marking the first working long pipe vehicle whose hydrogen supply is cut off as a no-load long pipe vehicle, and immediately driving the first working long pipe vehicle out of the steel smelting plant towards the hydrogen supply station for adding hydrogen; before a hydrogen pressure value in the second working long pipe vehicle is lower than the set pressure supply value, enabling at least one fully-loaded long pipe vehicle in transit to enter the steel smelting plant and stop in any one of the designated working parking spaces to become a standby long pipe vehicle; and achieving vehicle-mounted cyclic hydrogen supply.

2. The vehicle-mounted hydrogen supply method for hydrogen-rich smelting in a blast furnace or shaft furnace according to claim 1, wherein at least three designated dedicated parking spaces are arranged in the steel smelting plant for parking two working long pipe vehicles and one standby long pipe vehicle; and at least two intake pipelines connected to the pressure reducing system are provided, and at least one of the at least two intake pipelines is connected to a hydrogen outlet of at least one of the two working long pipe vehicles through an intake hose provided with a stop valve.

3. The vehicle-mounted hydrogen supply method for hydrogen-rich smelting in a blast furnace or shaft furnace according to claim 1, wherein the pressure reducing system comprises two stop valve pressure reducers connected to two intake pipelines respectively, and the stop valve pressure reducers are alternately used to achieve continuous pressure reduction supply of hydrogen.

4. The vehicle-mounted hydrogen supply method for hydrogen-rich smelting in a blast furnace or shaft furnace according to claim 1, wherein the set pressure supply value is 15 bar.

5. A vehicle-mounted hydrogen supply device for hydrogen-rich smelting in a blast furnace or shaft furnace, comprising:
   hydrogen transport apparatuses, configured to transport hydrogen from a hydrogen supply station to a steel smelting plant, and at least comprising a first working long pipe vehicle, a second working long pipe vehicle and a standby long pipe vehicle, wherein the first working long pipe vehicle, the second working long pipe vehicle and the standby long pipe vehicle can supply hydrogen and are all located in designated working parking spaces of the steel smelting plant;
   a pressure reducing system, comprising an intake pipeline, a pressure reducing pipeline and an output pipeline connected in sequence, wherein the output pipeline comprises an output main pipe;
   the intake pipeline at least comprises a first intake branch and a second intake branch; input ends of the first intake branch and the second intake branch are respectively connected to the first working long pipe vehicle and the second working long pipe vehicle, and the first intake branch and the second intake branch are both provided with a manual butterfly valve and a first stop valve;
   the pressure reducing pipeline at least comprises a first pressure reducing branch and a second pressure reducing branch; input ends of the first pressure reducing branch and the second pressure reducing branch communicate with each other and are connected to output ends of the first intake branch and the second intake branch, and output ends of the first pressure reducing branch and the second pressure reducing branch communicate with each other and are connected to an input end of the output main pipe of the output pipeline;
   the output main pipe is provided with a first check valve and a rapid cut-off valve in sequence, the input end of the output main pipe is connected to the output ends of the first pressure reducing branch and the second pressure reducing branch, and an output end of the output main pipe is connected to an injection system;
   the injection system, comprising an annular main pipe connected to the output end of the output main pipe, wherein an output end of the annular main pipe is provided with a plurality of injection branch pipes, and each injection branch pipe is connected to a tuyere of the blast furnace through a metal hose and a fire arrestor; and
   a control system, comprising a transport computing module and a pressure reducing control module, wherein:
   the transport computing module computes the number of long pipe vehicles in transit according to an inputted distance between the hydrogen supply station and the steel smelting plant and daily hydrogen demand of the steel smelting plant; and the pressure reducing control module cyclically opens the first pressure reducing branch and the second pressure reducing branch according to a pressure value of the intake pipeline.

6. The vehicle-mounted hydrogen supply device for hydrogen-rich smelting in a blast furnace or shaft furnace according to claim 5, wherein the pressure reducing system further comprises a nitrogen protection pipeline, and the nitrogen protection pipeline comprises a nitrogen input branch and a nitrogen output branch; the nitrogen input branch is provided with a first pressure regulating apparatus, a second check valve, a second stop valve and a first cold angle valve in sequence, an input end of the nitrogen input branch is connected to a nitrogen supply apparatus, and an output end of the nitrogen input branch is connected to an output end of the first intake branch; and the nitrogen output branch is provided with a second cold angle valve, a concentric reducer and a bleeding valve in sequence, and an input end of the nitrogen output branch is connected to the input end of the first pressure reducing branch.

7. The vehicle-mounted hydrogen supply device for hydrogen-rich smelting in a blast furnace or shaft furnace according to claim 6, wherein the pressure reducing pipeline further comprises at least one standby pressure reducing branch connected in parallel at both ends of the first pressure reducing branch and the second pressure reducing branch, and the first pressure reducing branch and the second pressure reducing branch are both provided with a third stop valve, a second pressure regulating apparatus and a first needle valve in sequence; and the at least one standby pressure reducing branch provided with a fourth stop valve and a second needle valve in sequence.

8. The vehicle-mounted hydrogen supply device for hydrogen-rich smelting in a blast furnace or shaft furnace according to claim 6, wherein the first pressure regulating apparatus and a second pressure regulating apparatus both comprise a pressure regulating valve and a spring safety valve, the pressure regulating valve of each of the first and second pressure regulating apparatuses is configured to automatically eliminate a residual pressure head of a pipeline and a flow deviation caused by pressure fluctuation, one end of the spring safety valve of each of the first and second pressure regulating apparatuses is connected to the pressure regulating valve of the corresponding first and second pressure regulating apparatuses, and input ends of needle valves of the first pressure reducing branch, the second pressure reducing branch and a third pressure reducing branch are all connected between the second cold angle valve and the concentric reducer of the nitrogen output branch through stop valves.

9. The vehicle-mounted hydrogen supply device for hydrogen-rich smelting in a blast furnace or shaft furnace according to claim 8, wherein a tail end of a branch pipe at the output end of the second pressure reducing branch is provided with a third cold angle valve, a tail end of a branch pipe of the first pressure reducing branch is provided with a fifth stop valve and a sixth pressure gauge, and the sixth pressure gauge detects an output pipeline pressure of the pressure reducing pipeline when the fifth stop valve is opened.

10. The vehicle-mounted hydrogen supply device for hydrogen-rich smelting in a blast furnace or shaft furnace according to claim 9, wherein the rapid cut-off valve of the output main pipe is provided with a pressure control valve, and an output end of the pressure control valve is connected between the third spring safety valve and the concentric reducer.

* * * * *